(12) United States Patent
Egawa et al.

(10) Patent No.: US 6,295,104 B1
(45) Date of Patent: Sep. 25, 2001

(54) FRONT ILLUMINATING SYSTEM WITH LAYER BETWEEN LIGHT GUIDE AND LCD

(75) Inventors: Motoji Egawa; Nobuhiro Sato; Shingo Suzuki, all of Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/317,172

(22) Filed: May 24, 1999

(30) Foreign Application Priority Data

May 26, 1998 (JP) .................................................. 10-143933
May 28, 1998 (JP) .................................................. 10-147511

(51) Int. Cl.[7] .............................. G02F 1/1335; F21V 8/00
(52) U.S. Cl. .................................. 349/63; 362/26; 362/31
(58) Field of Search ................................. 349/65, 61, 62, 349/63; 362/26, 31

(56) References Cited

U.S. PATENT DOCUMENTS

| | | | |
|---|---|---|---|
| 5,341,231 | * | 8/1994 | Yamamoto et al. ................... 349/62 |
| 5,394,255 | * | 2/1995 | Yokota et al. .......................... 349/65 |
| 5,808,709 | * | 9/1998 | Davis et al. ............................ 349/65 |
| 5,838,403 | * | 10/1999 | Jannson et al. ........................ 349/65 |
| 5,961,198 | * | 10/1999 | Hira et al. .............................. 349/65 |
| 6,048,071 | * | 4/2000 | Sawayama ............................. 349/62 |

FOREIGN PATENT DOCUMENTS 0 924 549 A1   6/1999  (EP) .
2 234 581      2/1991  (GB) .

OTHER PUBLICATIONS

Tai et al, "A Transparent Frontlighting System for Reflective Type Displays", SIDDigest '95, May 1995.*

* cited by examiner

Primary Examiner—Kenneth Parker
(74) Attorney, Agent, or Firm—Oliff & Berridge, PLC

(57) ABSTRACT

In a transparent and spread illuminating apparatus 1, a light reflection pattern 7 consisting of the concave and convex is formed on the front surface 6 of a transparent substrate 2 so that the emission light is allowed to be uniformly irradiated on the face of the transparent substrate 2 regardless of a distance from a light source lamp 4, and the light is facially irradiated on a reflection type liquid crystal display element L. In addition, a transparent member 11 for changing the progressing direction of the light reflected from the transparent substrate 2 is disposed between the reflection type liquid crystal display element L and the transparent substrate 2 so as to be in close contact with both surfaces thereof. As a result, the degradation of the contrast which makes the observation of an image difficult and the generation of the moire pattern can be prevented.

5 Claims, 5 Drawing Sheets

FRONT ILLUMINATING SYSTEM WITH LAYER BETWEEN LIGHT GUIDE AND LCD

BACKGROUND OF THE INVENTION

1. Field of Invention

The present invention relates to a transparent and spread illuminating apparatus which is integrated with a display unit used in a front-surface illuminating means for a variety of reflection type display units and so on, and more particularly to a transparent and spread illuminating apparatus used as a front-surface illuminating means in a reflection type liquid-crystal display unit.

2. Background of Related Art

A liquid-crystal display unit operable with a low electric power consumption has been demanded increasingly for display units mainly applied to computers because it is thin in configuration, light in weight and so on. Since liquid crystal which is a structural element of the liquid-crystal display unit emits no light by itself, an illuminating means for illuminating an image is required, which is different from a light emission type device such as a CRT. In particular, in the circumstances where a demand for fine and colored image in high level is increased recently, the liquid-crystal display unit backed with a high-luminance spread light source is usually used. However, since, in order to enable the spread light source to be illuminated, because an excessive electric power is required, there occurs such a problem that the feature of liquid crystal having a low electric power consumption is lessened.

In particular, a portable liquid-crystal device frequently used with the advantages of the liquid-crystal display unit thin in configuration and light in weight, there is a drawback that the consumption of an internal electric power becomes increased due to the illuminating of the spread light source which is provided in the liquid-crystal display unit to remarkably shorten a period of illuminating time for using it as a portable device.

In order to solve the above problem, there has been developed a reflection type liquid crystal element that may operate, even if no spread light source is provided, by using an ambient light as illuminating means, and in particular, a demand for a reflection type liquid crystal element for a color display has been increased while a higher image quality has been required in the recent years.

The most basic structure of the reflection type liquid-crystal device is designed in such a manner that two flat glass substrates, on each of one surfaces of which a transparent electrode is disposed and on each of the other surfaces of which a polarization plate is disposed, are formed so as to oppose their transparent electrodes to each other at a given interval, and liquid crystal material is filled between the respective glass substrates. Furthermore, a color filter is disposed on the glass substrate which is on an observation face side, and a high-efficient reflector is disposed on the glass substrate which is on a back surface side.

In this example, the transparent electrode plate of the glass substrate which is on the back surface side is patterned, and in order to display a desired image, switching devices are connected to the transparent electrode plate, respectively.

In the reflection type liquid-crystal device thus structured, since an ambient light incident to the reflector disposed on its back surface from the surroundings is reflected so as to be brightly illuminate a screen, an image can be observed.

However, since the reflection type liquid-crystal device has a structure such that, as mentioned above, an ambient light incident to the reflector illuminates the screen, its display quality depends on the ambient brightness. In particular, in demand for high quality concerning image on display, since a constitution of the color display reflection type liquid crystal, the demand of which is expected to be increased, has to become such that the color filter and the like are added thereto, its reflectivity becomes lower than that of monochrome liquid crystal. Accordingly, in a state where the amount of light to be irradiated on the screen is a little (that is, the surrounding is relatively dark), because the luminance of the screen is not sufficient, auxiliary light is required for observing an image.

As an appropriate auxiliary illuminating means for the above reflection type liquid-crystal device, there has been disclosed a transparent and spread illuminating apparatus in Japanese Patent Application No. Hei 9-347648.

A transparent and spread illuminating apparatus 1' shown in FIG. 8 is disposed so as to cover the observation face F of the above-structured reflection type liquid-crystal device L for use, and its structure is such that a linear light source lamp 4 is disposed so as to be close to one side end surface 3 of the flat transparent substrate 2 which is made of a material high in transmittance and shaped in a rectangle in section as shown in FIGS. 8 and 9. As the light source lamp 4, a cold cathode fluorescent tube (CCFL), a heat cathode fluorescent tube (HCFL) or the like is used.

In this example, it is assumed that, in FIG. 9, one surface (a lower side in FIG. 9) of the transparent substrate 2 which abuts on the reflection type liquid crystal device L is a lower surface 5, and its opposite surface (an upper side in FIG. 9) which is on an observation face (screen) side is a top surface 6.

On the top surface 6 of the transparent substrate 2 is formed a light reflection pattern 7. The light reflection pattern 7 is made up of a large number of grooves 8 which are substantially triangular in section and a large number of flat portions 9 adjacent to the grooves 8.

The light reflection pattern 7 is designed in such a manner that intervals between which the grooves 8 are formed are different depending upon the position of the groove so that the brightness becomes nearly uniform at any positions in the transparent substrate 2 without being influenced by the distances from the light source lamp 4 as shown in FIG. 9. In other words, the ratio of the width (occupied area) of the grooves 8 to the width (occupied area) of the flat portions 9 is set so as to gradually increase as the grooves 8 or the flat portions 9 become farther from the one side end surface 3 of the transparent substrate 2.

With the addition of the transparent and spread illuminating apparatus 1' thus structured as an auxiliary illumination, a light emitted from the light source lamp 4 is made incident to the interior of the transparent substrate 2 from the one side end surface 3 of the transparent substrate 2, and progresses toward the opposite surface 10 while the light repeats reflection and refraction in the interior of the transparent substrate 2. During this action, the light is emitted from the lower surface 5 of the transparent substrate 2 little by little with the result that the light is irradiated on the reflection type liquid-crystal device L which is disposed in close contact with the transparent substrate 2. Furthermore, since the light reflection pattern 7 is formed on the transparent substrate 2, the distribution of the amount of light emitted from the lower surface 5 can be made nearly uniform entirely thereon with the result that the light is uniformly irradiated on the reflection type liquid crystal element L.

Although being omitted in FIGS. 8 and 9, since a peripheral surface of the light source lamp 4 which is not faced on the one side end surface 3 is covered with a film-shaped reflection member, the coupling efficiency of a light can be enhanced. Furthermore, when the side surfaces of the transparent substrate 2 except for the one side end surface 3 are also covered with a reflection member, since the light is prevented from being emitted from the side end surfaces, the amount of light emitted from the lower surface 5 of the transparent substrate 2 can be increased. In particular, on the opposite surface 10 of the one side end surface 3, since the amount of emitted light is larger than those of two other side surfaces, it is desirable that the opposite surface 10 is covered with a reflection member.

Also, since a direction of the light emitted from the lower surface 5 of the transparent substrate 2 varies by changing an angle of reflection of the light in accordance with the configuration of the grooves 8 of the light reflection pattern 7, the configuration of the groove 8 can be appropriately set so that a large amount of light is emitted in a direction perpendicular to the lower surface 5 (that is, a front-surface direction).

Further, in the case where the observation face F of the reflection type liquid crystal element L is observed at a location where the surroundings are light, electric power consumption may be suppressed by turning off the light source lamp 4 of the transparent and spread illuminating apparatus 1', thereby to enable a period of time during which the internal electric power supply is used to become long. In this case, although the transparent and spread illuminating apparatus 1' is disposed on the observation face F of the reflection type liquid crystal element L through the flat portions 9 of the light reflection pattern 7, since the observation face F can be observed through the flat portions 9 of the light reflection pattern 7, the screen can be observed substantially as well as a case where no transparent substrate 2 is provided.

In order to ensure the luminance of the screen of the reflection type liquid-crystal device L, the transparent and spread illuminating apparatus 1' serving as the auxiliary illumination is added to the observation face F side so that the screen can be observed without being influenced by the ambient brightness.

However, it has been proved that the addition of the transparent and spread illuminating apparatus 1' leads a degradation of the contrast of the screen (that is, the screen is whitened) remarkable in the case where the observation face F of the reflection type liquid crystal element L is observed at a location where the surroundings are light.

This reason will be described below. That is, the displaying of the image on the reflection type liquid crystal element L is carried out by a light resulting from reflecting the progressing ambient light at the reflector disposed on the back surface of the reflection type liquid crystal element L. The incident ambient light is interfacially reflected (Fresnel reflection) not on the reflector but on the top surface 6 or the lower surface 5 of the transparent and spread illuminating apparatus 1' or the observation face F of the reflection type liquid crystal display element L.

When the ambient light is thus interfacially reflected so that the contrast is degraded into a state where the screen is whitened, there arises such a problem that it becomes difficult to observe the image.

In addition, it has been found that there is a case in which the addition of the transparent and spread illuminating apparatus 1' makes a moire pattern to be generated on the observation face F of the reflection type liquid crystal element L.

The moire pattern is an interference stripe caused by occulting stripes occurring because the grooves 8 and the flat portions 9 are different in transparent factor between each other, and an arrangement of a mosaic pattern (a dotted line drawn in the reflection type liquid crystal cells that form the pixels of the reflection type liquid crystal element L, when the light is reflected by the light reflection pattern 7 on the tranparent substrate 2. This interference stripe leads to such a problem that is difficult to observe an image.

SUMMARY OF THE INVENTION

The present invention has been achieved as a result of various studies in order to solve the above problems, and therefore an object of the present invention is to provide a transparent and spread illuminating apparatus that suppresses the degradation of the contrast and the generation of the moire pattern which may make the observation of an image difficult.

In order to achieve the above object, according to a first aspect of the present invention, in a transparent and spread illuminating apparatus in which a transparent substrate is disposed so as to cover the front surface of a reflection type liquid crystal display element, it is characterized in that a light source lamp is disposed so as to be close to at least one side surface of said transparent substrate, a light reflection pattern consisting of concave and convex is formed on a front surface of said transparent substrate, a transparent member to change the progressing direction of the light emitted from the light source lamp and incident upon the reflection type liquid crystal element is interposed between the transparent substrate and the reflection type liquid crystal element.

According to a second aspect of the present invention, it is characterized in that a refractive index of said transparent member is lower than the transparent substrate. According to a third aspect of the present invention, it is characterized in that assuming that the refractive index of the transparent member is N1, and the refractive index of the transparent substrate is N2, the ratio of N2/N1 is in a range of $1.05 \leq N2/N1 \leq 1.15$.

According to a fourth aspect of the present invention, it is characterized in that the transparent member is liquid, gel or an elastic material.

According to a fifth aspect of the present invention, it is characterized in that the transparent member consists of a dispersion plate to disperse the passing light.

According to a sixth aspect of the present invention, it is characterized in that the dispersion plate includes beads.

According to a seventh aspect of the present invention, it is characterized in that a haze value is from 10 to 30%.

With the above structure, in the transparent and spread illuminating apparatus of the present invention, the light reflection pattern consisting of the concave and convex is formed on the front surface of the transparent substrate, the light is allowed to be uniformly irradiated on the surface of the transparent substrate regardless of a distance from the light source lamp, and the transparent member to change the progressing direction of the light passing through is disposed between the reflection type liquid crystal display element and the transparent substrate so as to be in close contact with both surfaces thereof, to thereby suppress the interfacial reflection (Fresnel reflection) and the moire pattern generated on the surface on the reflection type liquid crystal display element.

BRIEF DESCRIPTION OF THE DRAWINGS

These and other objects, features and advantages of this invention will become more fully apparent from the following detailed description taken with the accompanying drawings in which.

DETAILED DESCRIPTION OF PREFERRED EMBODIMENTS

Now, a description will be given in more detail of preferred embodiments of the present invention with reference to the accompanying drawings.

Figure 8:
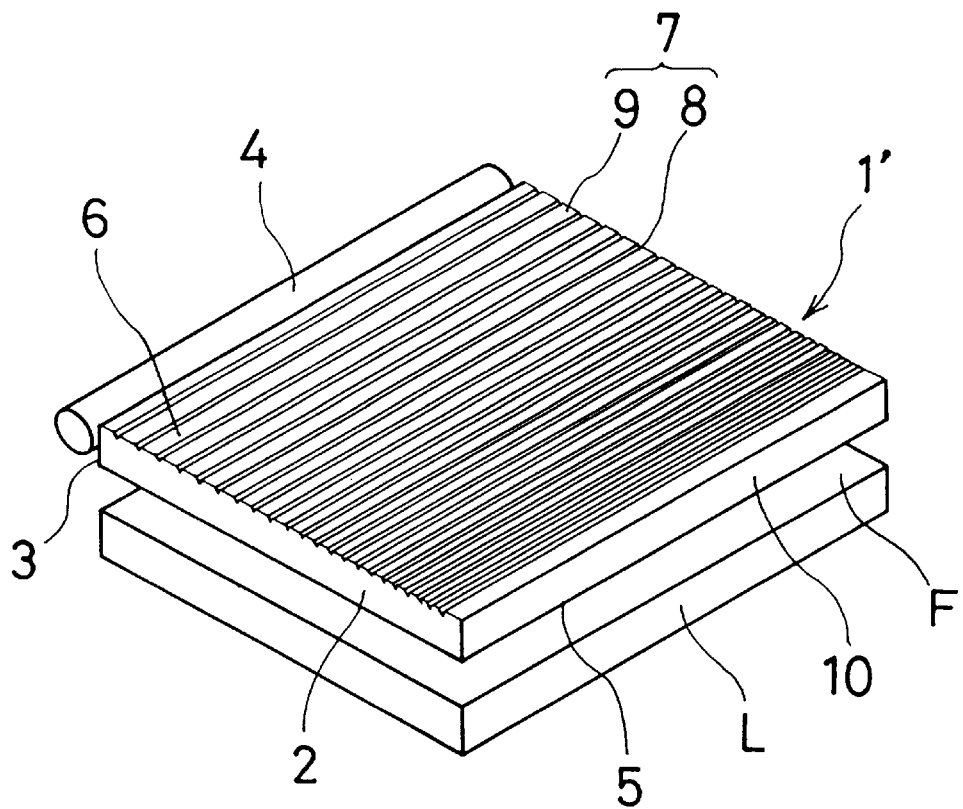
FIG. 8 is a perspective view showing the structure of a conventional transparent and spread illuminating apparatus.
Figure 9:
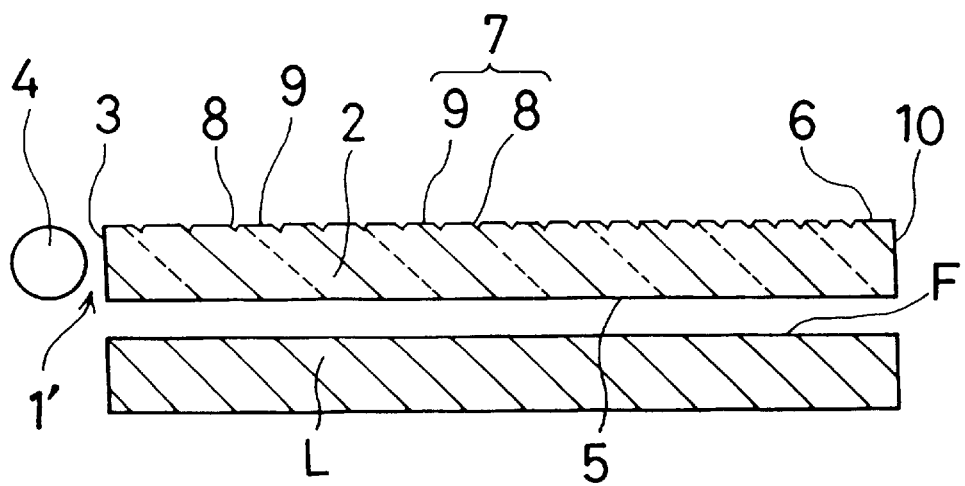
FIG. 9 is a cross-sectional view showing the structure of the transparent and spread illuminating apparatus shown in FIG. 8.

In explanation of the structure of a transparent and spread illuminating apparatus 1 of the present invention, the same parts as those of the transparent and spread illuminating apparatus 1' which was described in "background of the invention" with reference to FIGS. 8 and 9 are denoted by identical references, and their detailed description will be omitted.

Figure 1:
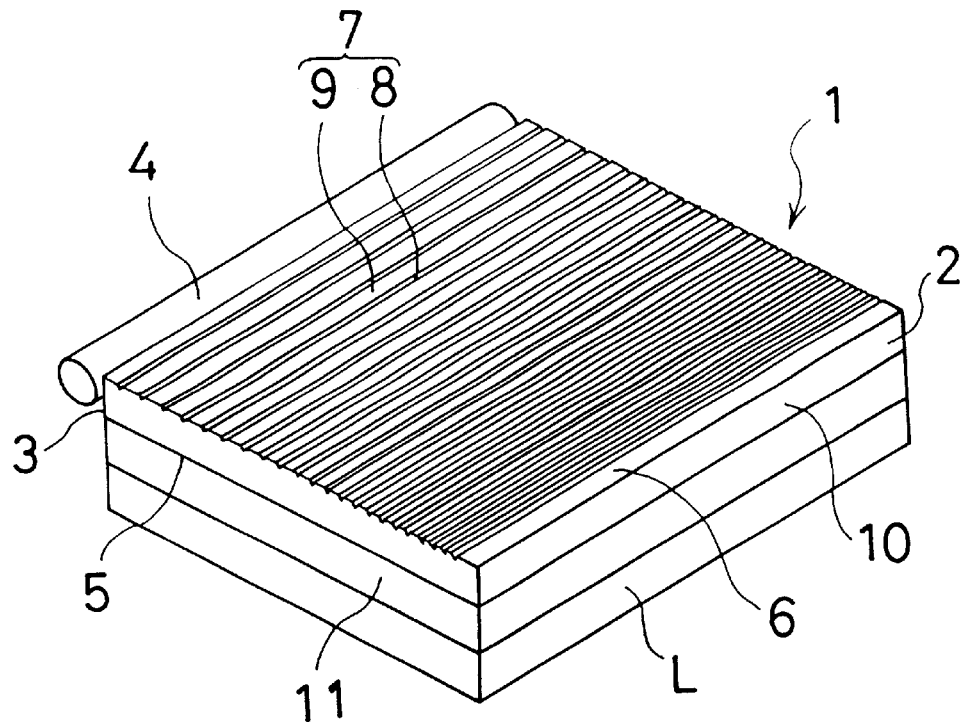
FIG. 1 is a perspective view showing the structure of a transparent and spread illuminating apparatus of the present invention.
Figure 2:
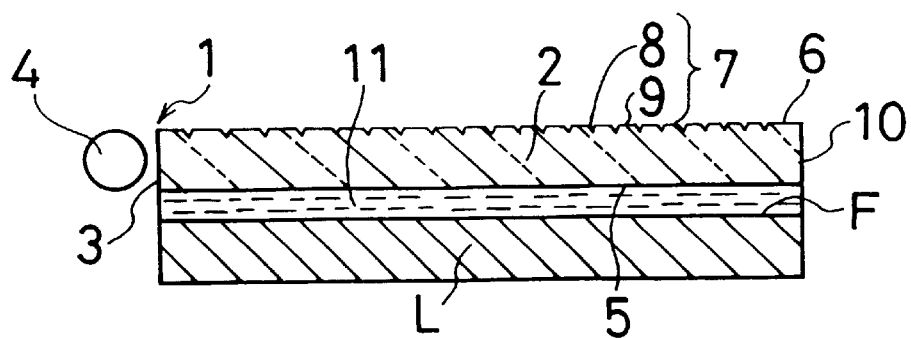
FIG. 2 is a cross-sectional view showing the structure of the transparent and spread illuminating apparatus shown in FIG. 1.

As shown in FIGS. 1 and 2, the structure of the transparent and spread illuminating apparatus 1 is nearly identical with the conventional one, and mainly composed of a transparent substrate 2 and a light source lamp 4. A difference between the transparent and spread illuminating apparatus 1 and the conventional apparatus 1' resides in that a transparent member 11 smaller in refractive index than at least the transparent substrate 2 is disposed between an observation face F of a reflection type liquid crystal element L and a lower surface 5 of the transparent substrate 2 so as to be in close contact therewith. Other structures are identical with those of the conventional apparatus.

The reason why the transparent member 11 smaller in refractive index than the transparent substrate 2 is thus provided in the transparent and spread illuminating apparatus 1 of the present invention will be described below in comparison with the conventional transparent and spread illuminating apparatus 1'.

It has been found that, in order to prevent that a screen from being whitened due to the degradation of the contrast of the observation face F of the reflection type liquid crystal element L, the Fresnel reflection has to be suppressed as described above. In this example, assuming that the ambient light is made incident from the front surface of the transparent and spread illuminating apparatuses 1 and 1', the Fresnel reflection factor of the lower surface 5 of the transparent substrate 2 is represented by the following formula:

$$\{(N2-N1)/(N2+N1)\}2 \times 100(\%) \tag{1}$$

where N1 is a refractive index of a material which is in contact with the lower surface 5 of the transparent substrate 2, and N2 is a refractive index of the transparent substrate 2.

In the conventional transparent and spread illuminating apparatus 1', since a material which is in contact with the lower surface 5 of the transparent substrate 2 is air, the refractive index N1 is about 1. On the other hand, in the transparent and spread illuminating apparatus 1 of the present invention, because the transparent member 11 is disposed in close contact with the lower surface 5 of the transparent substrate 2, the refractive index N1 is identical with the refractive index of the transparent member 11. Since the Fresnel reflection factor can be represented by the relation of the above formula (1), it reduces more as the refractive index (that is refractive index N1) of the transparent member 11 increases more than 1, and when the refractive index of the transparent member 11 becomes equal to N2, the Fresnel reflection factor becomes minimum, that is, 0. Therefore, it is desirable that the refractive index of the transparent member 11 is equal to the refractive index of the transparent substrate 2.

Also, in order to function as the transparent and spread illuminating apparatus 1, a light must be uniformly irradiated over the entire observation face F of the reflection type liquid crystal element L irrespective of the position of the light source lamp 4. For that reason, a progressing state of the light emitted from the light source lamp 4 when it is made incident to the transparent substrate 2 from the one side end surface 3 will be first described with reference to FIG. 3.

Figure 3:
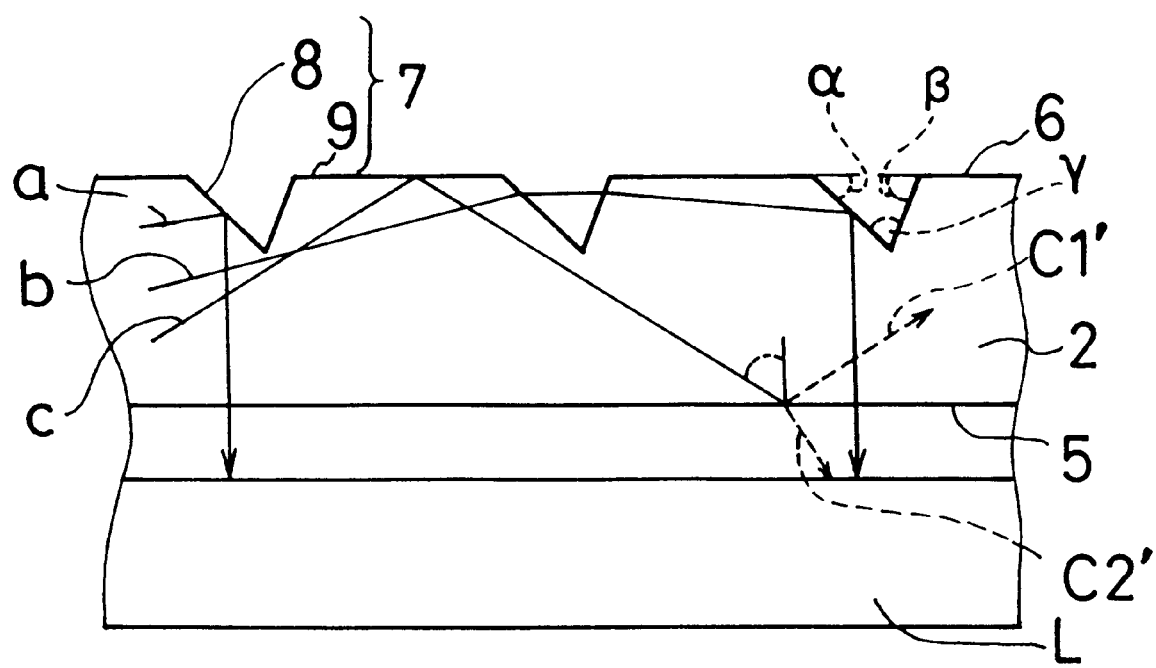
FIG. 3 is a cross-sectional view for explaining the configuration of a light reflection pattern shown in FIG. 1.
Figure 4:
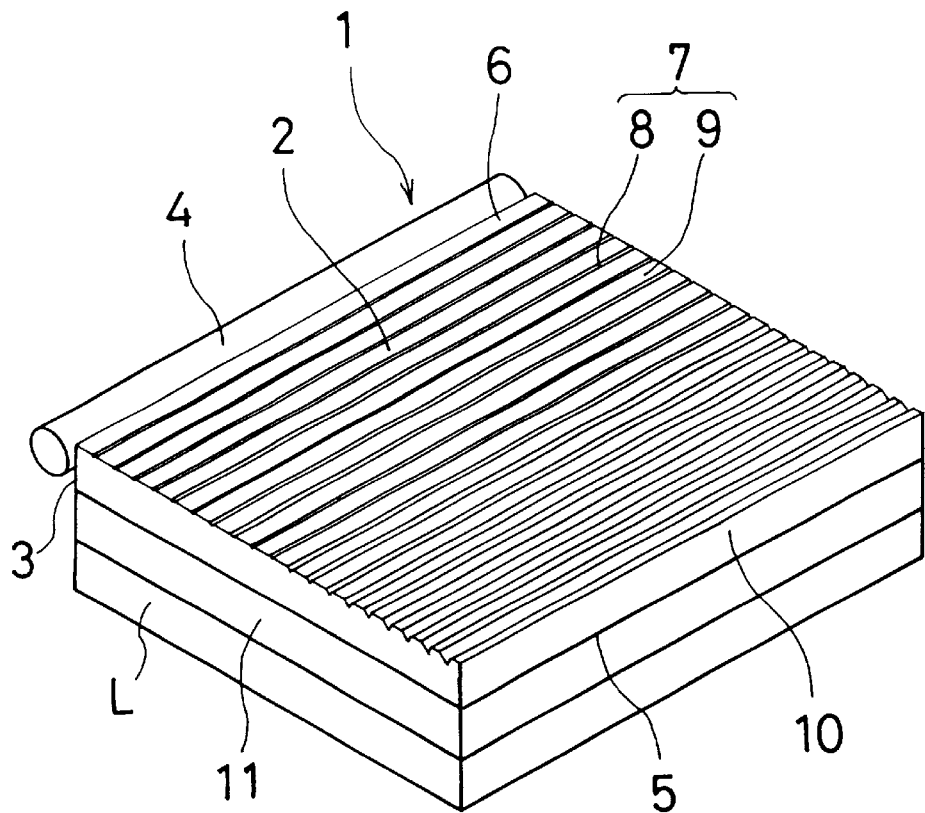
FIG. 4 is a perspective view showing the structure of a transparent and spread illuminating apparatus which is different from that of FIG. 1.
Figure 5:
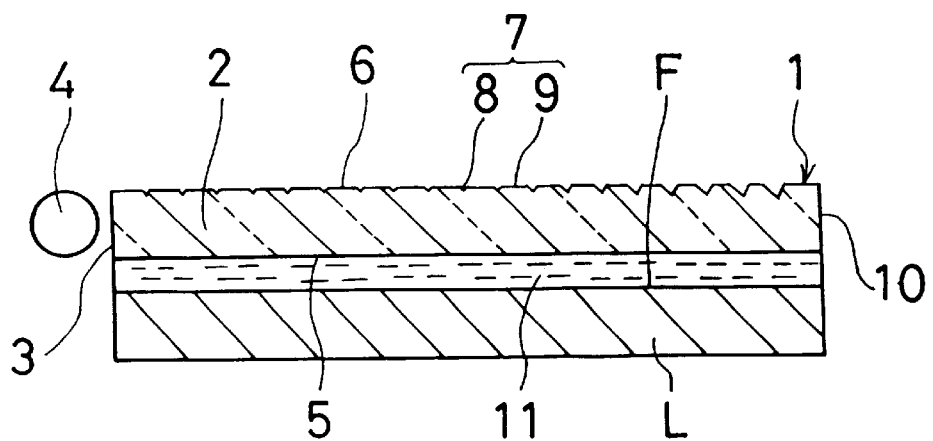
FIG. 5 is a cross-sectional view showing the structure of the transparent and spread illuminating apparatus shown in FIG. 4.

In FIG. 3, the light source lamp 4 which is omitted from the figure is situated on the left side so that the light progresses basically from the left side to the right side. Now, for explanation of a light progressing state, a representative progressing state is roughly classified into three states, and the progressing examples a, b and c will be described, respectively.

In the light progressing example a, a light is totally reflected at the grooves 8 of the light reflection pattern 7 on the transparent substrate 2, passes through the lower surface 5 of the transparent substrate 2 and progresses to the reflection type liquid crystal element L. The light finally arrives at the observation face F of the reflection type liquid crystal element L. In the light progressing example b, a light passes through the grooves 8 and progresses to the exterior of the transparent substrate 2 once. However, because the light is refracted when passing through the grooves 8, it again progresses to the interior of the transparent substrate 2, and is finally totally reflected by the inclined surface of the grooves 8 so as to arrive at the observation face F of the reflection type liquid crystal element L. As described in the light progressing example b, because the angle of inclination of the inclined surface of the grooves 8 is set so that the light passes through the groove 8 may be refracted in a direction along which the light again progresses to the interior of the transparent substrate 2, most of the light incident to the interior of the transparent substrate 2, of the light emitted from the light source lamp 4, illuminates the reflection type liquid crystal element L.

Further, in the light progressing example c, a light is totally reflected on the flat portions 9 of the light reflection pattern 7 on the transparent substrate 2 so as to arrive at the lower surface 5.

In the case of the conventional transparent and spread illuminating apparatus 1', since air exists below the lower surface 5 of the transparent substrate 2 (refractive index:

about 1), as shown in the progressing example c1' subsequent to the light progressing example c where the light is totally reflected on the top surface 6 and progresses to the lower surface 5, the light is totally reflected on the lower surface 5. In this way, the light of the progressing example c1' gradually progresses in the transparent substrate 2 toward a direction far from the light source lamp 4, and in the schematic diagram of FIG. 3, the light is not emitted to the exterior of the transparent substrate 2.

Accordingly, the widths of the flat portions 9 (that is, intervals between the respective grooves 8) are appropriately adjusted so that the light that progresses in the transparent substrate 2 can be separated into an emission light and a progressing light. As a result, the light reflection pattern 7 is formed in such a manner that a rate of the grooves 8 increases more, that is, the widths of the flat portions 9 are gradually narrowed more as the position of the grooves is far from the light source lamp 4 (toward the right side in FIG. 9), as a result of which a desired emission light can be obtained even on an opposite surface 10 which is at a side opposite to the light source lamp 4. Thus, a light can be uniformly irradiated even on the entire observation face F of the reflection type liquid crystal element L.

On the other hand, the transparent and spread illuminating apparatus 1 of the present invention is structured in such a manner that the transparent material 11 is disposed in close contact with the lower surface 5 of the transparent substrate 2. In this situation, assuming that N1 is a refractive index of the transparent material 11, N2 is a refractive index of the transparent substrate 2 and θ is an incident angle of the light indicated in the progressing example c to the lower surface 5, a condition under which the light is totally reflected is represented by the following formula.

$$\sin \theta \geq N1/N2 \qquad (2)$$

In the case where formula (2) is not satisfied, as shown in the progressing example c2', the light is refracted at a given angle on the lower surface 5 toward the exterior of the transparent substrate 2, emitted and then arrives at the observation face F of the reflection type liquid crystal element L. In this way, in the case where the light is permitted to be emitted to the exterior of the transparent substrate 2 without being totally reflected by the lower surface 5, no progressing light exists, and all of the lights represented by the progressing examples a, b and c become a light which is irradiated on the reflection type liquid crystal element L. As a result, one part of the reflection type liquid crystal element L only at a side close to the light source lamp 4 is brightly irradiated by the light so that the uniformity of illumination is remarkably lost. In order to maintain the uniformity of illumination, as is apparent from formula (2), because formula (2) is not established at least unless N2 is larger than N1, the refractive index of the transparent member 11 needs to be selected so as to be lower than the refractive index of the transparent substrate 2.

As described above, taking formulas (1) and (2) into consideration, the refractive index of the transparent member 11 needs to be set to be lower than the refractive index (N2) of the transparent substrate 2 to ensure the uniformity of illumination, and also needs to be nearly equal to the refractive index of the transparent substrate 2 from the viewpoint of preventing the degradation of the contrast of a screen by suppressing the Fresnel reflection. Therefore, the refractive index of the transparent member 11 must be made smaller than at least the refractive index of the transparent substrate 2, and is selected so that the uniformity of illuminating the screen and the prevention of the degradation of the contrast of the screen may be realized.

It is observed, while the reflective index of the transparent member 11 is changed, whether the observation face F of the reflection type liquid crystal element L having the transparent and spread illuminating apparatus 1 of the present invention is whitened or not, and the uniformity of illumination is observed.

TEST EXAMPLE 1

The structure of the transparent and spread illuminating apparatus 1 is identical with those described in FIGS. 1 and 2, in which a transparent substrate 2 is formed of a transparent flat plate made of acrylic resin (sizes: 240 mm×160 mm, thickness 3 mm, refractive index N2=1.49), and on a top surface of the transparent substrate 2 a light reflection pattern 7 consisting of grooves 8 which are in parallel with its longitudinal sides and triangular in section, and flat portions 9 is formed.

The grooves 8 of the light reflection pattern 7 are triangular in section, and in order to set an angle of inclination of the triangular grooves 8, an angle α, an angle β and an angle γ are decided as shown in FIG. 3. The angle α is a base angle at a side close to the light source lamp 4, among base angles of a triangle which is formed with the assumption of a virtual base S. Also, the angle β is a base angle different from the above angle α, and the angle γ is an angle of an apex of the virtual triangle (that is, a valley portion of the grooves 8).

The grooves 8 are formed in such a manner that the angle γ is constantly kept at 60°, and the angle is continuously varied so as to be set at 48° to 52° then 46°, from the one side end surface 3 toward the opposite surface 10, in accordance with which the angle β is also varied.

The respective depths of the grooves 8 are maintained constant at 10 μm, and in order to change the relative ratio of the grooves 8 and the flat portions 9, the widths of the flat portions 9 are set to be gradually reduced more as they are far from the light source lamp 4. More specifically, the ratio of the width of the grooves 8 to that of the flat portions 9 is constantly set at 0.1 in a region from one side end surface 3 to a position corresponding to ⅓ of the length between the one side end surface 3 and the opposite surface 10 of the transparent substrate 2, and the ratio of the grooves 8 is gradually increased more as the grooves 8 are formed close to the opposite surface 10 so that the ratio is set at 1.2 in the vicinity of the opposite surface 10.

Then, a cold cathode fluorescent tube 2.3 mm in outer diameter φ is used as the light source lamp 4 and abuts on the one side end surface 3. Then, the light source lamp 4 is turned on by an invertor with a tube current 3.5 mA and sine waves of an illuminating frequency 60 KHz.

In addition, although being not shown in FIGS. 1 and 2, there is provided a lamp reflector formed of any one of a reflection film on which metal in white, silver or the like is evaporated, and a reflection plate formed by bending metal plate such as an aluminum plate applied of a mirror finishing process so that an outer surface of the light source lamp 4 which is not faced on the one side end surface 3 is covered therewith, thereby, and a light emitted from the light source lamp 4 is allowed to progress in the transparent substrate 2 with high efficiency. Further, the side end surfaces of the transparent substrate 2 except for the one side end surface 3 where the light source lamp 4 is disposed are covered with the reflection member in order to increase the amount of light by making the light emitted from the side end surface incident to the interior of the transparent substrate 2 again. In particular, because the amount of emitted light on the opposite surface 10 is more than that of two other surfaces, the arrangement of the reflector is more effective.

In this way, it is desirable to use, to the utmost, the lamp reflector and the reflector which allow the amount of light to increase even in the transparent and spread illuminating apparatus 1 of the present invention.

Further, the samples of the transparent and spread illuminating apparatuses 1 using the transparent member 11 made by processing five kinds of materials different in the refractive index N1 (polycarbonate resin, acrylic resin, fluorine acrylic resin, transparent silicon rubber and amorphous fluorine resin) and using no transparent member 11 (that is, air) are prepared.

The reflection type liquid crystal element L which is substantially equal in size to the transparent substrate 2 is disposed on the back surface of the transparent and spread illuminating apparatus 1 as structured above, and an image is observed. In this example, the transparent material 11 and the reflection type liquid crystal element L are disposed to be in close contact with each other.

As shown in Table 1, in which the results of observing the image are indicated, a sample that cannot be used as a product is indicated by mark x and a sample that is excellent is indicated by mark ○ with respect to the uniformity of illumination and the degree of whitening of a screen.

TABLE 1

| Material of transparent member 11 | Refractive index N1 | N2/N1 | Uniformity illuminating light | Whitening degree of screen |
|---|---|---|---|---|
| Polycarbonate resin | 1.59 | 0.94 | x | ○ |
| Acrylic resin | 1.49 | 1.0 | x | ○ |
| Fluorine acrylic resin | 1.42 | 1.05 | ○ | ○ |
| Transparent silicon rubber | 1.40 | 1.06 | ○ | ○ |
| Amorphous fluorine resin | 1.34 | 1.11 | ○ | ○ |
| Air | 1.00 | 1.49 | ○ | x | wherein N2 = 1.49 (Acrylic resin)

As is apparent from Table 1, it has been found that the transparent member 11 of the refractive index N1 satisfying that N2/N1 is in a range of from 1.05 to 1.15 should be used in order to obtain excellent results of the uniformity of illumination and the whitening degree of the screen.

EXAMPLE 2

Subsequently, a transparent and spread illuminating apparatus 1 using the transparent substrate 2 made by processing polycarbonate resin (refractive index N2=1.59) and having other structures identical with those of Example 1 has been prepared, and the uniformity of illumination and the whitening degree of the screen have been evaluated in the same manner as in Example 1.

The results are shown in Table 2.

TABLE 2

| Material of transparent member 11 | Refractive index N1 | N2/N1 | Uniformity illuminating light | Whitening degree of screen |
|---|---|---|---|---|
| Polycarbonate resin | 1.59 | 1.0 | x | ○ |
| Acrylic resin | 1.49 | 1.07 | ○ | ○ |
| Fluorine acrylic resin | 1.42 | 1.12 | ○ | ○ |
| Transparent silicon rubber | 1.40 | 1.14 | ○ | ○ |
| Amorphous fluorine resin | 1.34 | 1.19 | ○ | Δ |
| None (Air) | 1.00 | 1.59 | ○ | x | wherein N2 = 1.59 (Polycarbonate resin)

In Table 2, Δ indicated in a column of the amorphous fluorine resin with respect to the whitening degree of the screen represents that the whitening degree of the screen is not good but relatively small. There has been proved from Table 2 that the transparent member 11 of the refractive index N1 satisfying that N2/N1 is in a range of from 1.05 to 1.15 should be used in order to obtain the excellent results of the uniformity of illumination and the whitening degree of the screen.

The transparent member 11 in the transparent and spread illuminating apparatus of the present invention is disposed in close contact with the lower surface 5 of the transparent substrate 2 as described above. In the present invention, the "disposed in close contact" means that the transparent member 11 is disposed with a clearance which is in a range smaller than at least 1 $\mu$m, since if the clearance between the transparent member 11 and the transparent substrate 2 (similarly as to between the transparent member 11 and the reflection type liquid crystal element L) is 1 $\mu$m or more, the clearance is equivalent to an air layer with the result that the above-mentioned effect of the present invention is eliminated. In addition, if the transparent member 11 is solid, even if the transparent member 11 is disposed in close contact with the lower surface 5 of the transparent substrate 2 and the observation face F of the reflection type liquid crystal element L in an initial state, there is a risk that the transparent member 11 is come off by a change of environments or the like. For this reason, it is desirable that the transparent member 11 is of liquid, gel or an elastic material so that they are always disposed in close contact with the two surfaces even if there is a change of environments.

Next, a second embodiment is explained, in which the transparent member 11 in the first embodiment is replaced with a plate which includes beads, which can pass the light but disperse the light progressing direction. This second embodiment is intended to solve a problem of a moire pattern.

As described above, the moire pattern is an interference stripe caused by occulting stripes occurring in the transparent substrate 2 and an arrangement of a mosaic pattern of liquid crystal cells that form the pixels of the reflection type liquid crystal element L. Therefore, with the arrangement of the light diffusion plate 11 such as the transparent and spread illuminating apparatus 1 of the present invention, a light emitted from the transparent substrate 2 is diffused to prevent the occulting stripes from occurring in the transparent substrate 2, as a result of which the occurrence of the moire pattern can be suppressed. However, since there is a case where the diffusion of the light emitted from the lower surface 5 of the transparent substrate 2 by the light diffusion plate 11 makes an image vague, there must be prepared the light diffusion plate 11 that suppresses the occurrence of the moire pattern and has the diffusiveness to such an extent that the clearness of an image is not lost.

Figure 6:
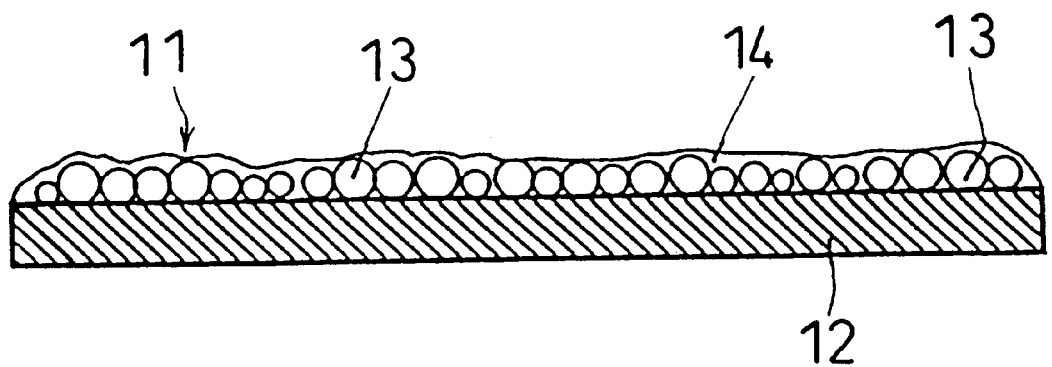
FIG. 6 is a cross-sectional view for explaining the configuration of a light dispersion plate.
Figure 7:
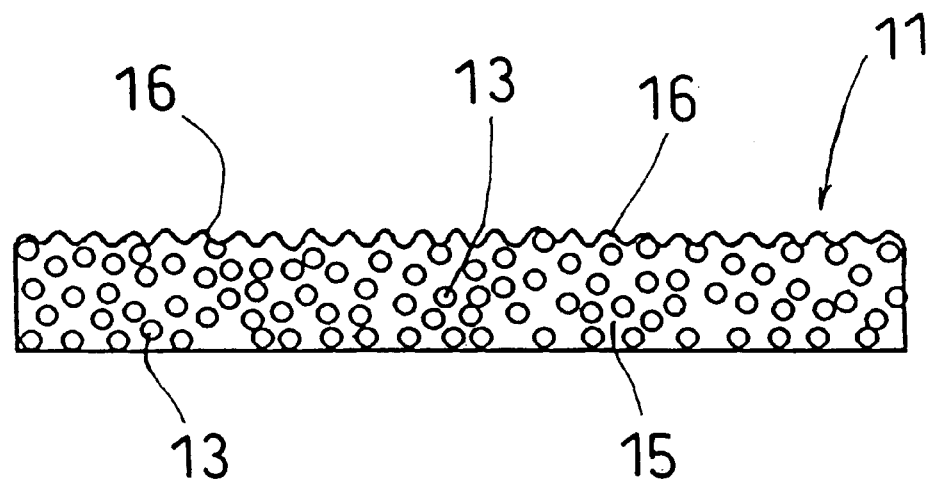
FIG. 7 is a cross-sectional view for explaining the configuration of a light dispersion plate which is different from that of FIG. 6.

The light diffusion plate 11 which is a main portion of the present invention is structured in such a manner that a diffusion layer 14 made of a transparent resin containing diffusion beads 13 that allows the light to be irregularly reflected is formed on the top surface of a sheet-shaped transparent support 12 having a size that covers the lower surface 5 of the transparent substrate 2 as shown in FIG. 6. Also, the light diffusion plate 11 shown in FIG. 7 is designed in such a manner that the top surface of the sheet-shaped transparent support 15 containing the diffusion beads 13 therein is formed fine and rough so that the light is diffused by not only the diffusion beads 13 but also a rough surface 16.

The light diffusion plate 11 has a function of diffusing a light, and is roughly classified into three structures, that is, a structure in which a diffusion layer containing diffusion beads therein is formed on the top surface of the transparent support (refer to FIG. 6), a structure in which diffusion beads are contained in the transparent support, and a structure in which the surface of the transparent support is formed fine and rough. The light diffusion plate 11 may be formed as those respective individual structures, or so as to obtain a desired diffusiveness by appropriately combining the above three structures as shown in FIG. 7.

The transparent supports 12 and 15 are formed of a sheet-shaped transparent film or a plate-like member, and may be made of various thermoplastic transparent resin such as acrylic resin, PET resin, vinyl chloride resin, polycarbonate resin, olefin resin or styrene resin. Also, a thermosetting transparent resin such as epoxy resin or allyldiglycol carbonate resin or an inorganic transparent material such as various glass materials may be applicable if there is a demand. In addition, the same material is applicable to a transparent resin that constitutes a diffusion layer containing diffusion beads 13 therein.

The diffusion beads 13 may be made of, for example, inorganic powders such as titanium oxide, magnesium oxide, aluminum oxide, calcium carbonate, barium sulfate, silica or glass powders, or organic powders such as acrylic or polystyrene.

Further, as a method of forming the fine-rough surface 16 on the transparent support 15, a method of directly processing the surface of the transparent support 15 through sand blasting, honing or the like is applicable. However, in the case where the transparent support 15 is made of thermoplastic resin, a die surface is subjected to a fine-rough forming process, and then transparent support 15 can be manufactured through various molding methods such as a casting method, a thermo-pressure molding method, an extrusion molding method or an injection molding method.

A machining process for forming the grooves 8 of the light reflection pattern 7 can be implemented by cutting with a diamond turning tool. In this case, since the turning tool for machining is employed while being fixed, the angle γ of the valley portion corresponding to the apex of the grooves 8 which are nearly triangular in section becomes constant. As a result, a sum of the inclined angle α and the inclined angle β is always kept constant, but as described above in the actual producing of the light reflection pattern 7 in the embodiment, the inclined angle β and the inclined angle β are defined so as to be appropriately changed within a variable range, to thereby realize spread illumination more efficiently.

In manufacturing the transparent and spread illuminating apparatuses 1 of the present invention, it is sufficient that the transparent substrates 2 is made of a material that allows the light to pass therethrough with high efficiency, and the transparent substrate 2 is most preferably made of acrylic resin from the viewpoint of its transparency and workability in processing. However, in the implementation of the present invention, the material of the transparent substrates 2 is not limited to acrylic resin, and may be made of various thermoplastic transparent resin such as vinyl chloride resin, polycarbonate resin, olefin resin or styrene resin. Also, thermosetting transparent resin such as epoxy resin or allyldiglycol carbonate resin, or inorganic transparent material such as various glass material may be applicable if occasions demand.

In addition, a method of producing the transparent substrates 2 can be made by directly machining such as cutting or grinding, and in case of resin material, various molding methods such as cast molding, extrusion molding, thermo-pressure molding or injection molding are applicable. The injection molding method using resin material is most preferable in view of productivity.

In this example, a linear fluorescent tube was used as a light source, but the present invention is not limited to this. For example, a light source may be structured so that a plurality of LED elements are disposed, a light source may be structured so that a plurality of fine incandescent lamps are disposed, or the like may be used.

As was described above, in the transparent and spread illuminating apparatus according to the characteristic off the present invention, the light reflection pattern consisting of the concave and convex is formed on the front surface of the transparent substrate so that the emission light is allowed to be uniformly irradiated on the face of the transparent substrate regardless of a distance from the light source lamp to illuminate the reflection type liquid crystal display element in a spread way, and the transparent member to change the progressing path of the light passing the transparent member is disposed between the reflection type liquid crystal display element and the transparent substrate so as to be in close contact with both surfaces thereof, to thereby suppress the interfacial reflection (Fresnel reflection) and the generation of the moire pattern. As a result, the degradation of the contrast which makes the observation of an image difficult can be prevented.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A transparent and spread illuminating apparatus in which a transparent substrate is disposed so as to cover an observing surface of a reflection type liquid crystal display element, wherein a light source is disposed so as to be close to at least one side surface of said transparent substrate, a light reflection pattern including concave portions is formed on an observing surface of said transparent substrate, and a transparent member is disposed between said reflection type liquid crystal display element and said transparent substrate so as to be in close contact with the observing surface of the liquid crystal display element and a surface of the transparent substrate opposite to the observing surface of the transparent substrate, and wherein assuming that the refractive index of the transparent member is N1, and the refractive index of the transparent substrate is N2, the ratio of N2/N1 is in a range of $1.05 \leq N2/N1 \leq 1.15$.

2. A transparent and spread illuminating apparatus as claimed in claim 1, wherein said transparent member is liquid, gel or an elastic material.

3. A transparent and spread illuminating apparatus as claimed in claim 1, wherein the transparent member is formed of a light diffusing plate for diffusing the light.

4. A transparent and spread illuminating apparatus as claimed in claim 3, wherein the light diffusing plate includes beads.

5. A transparent and spread illuminating apparatus as claimed in claim 3, wherein the light diffusing plate is formed by adhering a layer including beads on a transparent substrate.

* * * * *

UNITED STATES PATENT AND TRADEMARK OFFICE
CERTIFICATE OF CORRECTION

PATENT NO.     : 6,295,104 B1                                    Page 1 of 1
DATED          : September 25, 2001
INVENTOR(S)    : Motoji Egawa et al.

It is certified that error appears in the above-identified patent and that said Letters Patent is hereby corrected as shown below:

<u>Title page, Item [54] and Column 1, line 1,</u>
Title, please delete the current title and insert therefore:
-- SPREAD AND ILLUMINATING APPARATUS FOR CONTROLLING DEGRADATION OF CONTRAST --.

Signed and Sealed this

Fourteenth Day of May, 2002

*Attest:*

*Attesting Officer*

JAMES E. ROGAN
*Director of the United States Patent and Trademark Office*